July 5, 1938.  C. L. EKSERGIAN  2,122,810
SINGLE STAMPING ARTILLERY WHEEL
Filed April 4, 1932
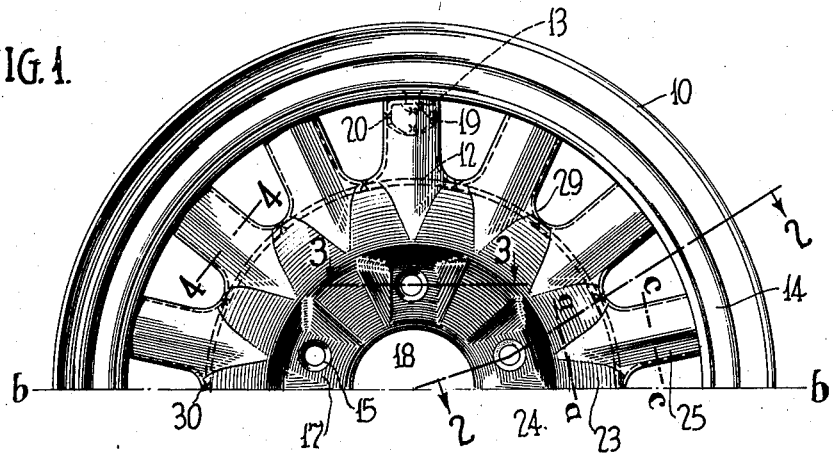
FIG. 1.
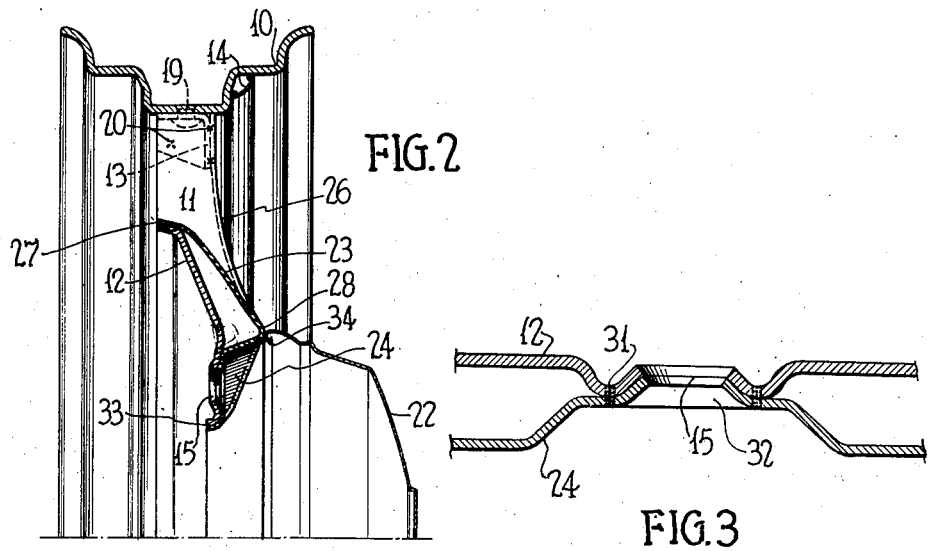
FIG. 2.
FIG. 3.
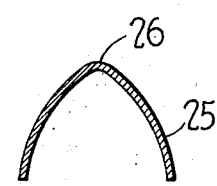
FIG. 4.
INVENTOR.
CAROLUS L. EKSERGIAN
BY John P. Zurbox
ATTORNEY.

Patented July 5, 1938

2,122,810

UNITED STATES PATENT OFFICE 2,122,810

SINGLE STAMPING ARTILLERY WHEEL

Carolus L. Eksergian, Detroit, Mich., assignor to Budd Wheel Company, Philadelphia, Pa., a corporation of Pennsylvania Application April 4, 1932, Serial No. 603,085

17 Claims. (Cl. 301—9)

My invention relates to vehicle wheels of the artillery steel type, and more particularly to the class of wheels of that type in which the body of the wheel comprised of nave and spokes together are formed of a unitary disc of steel or its equivalent pressed or stamped to give the desired form to the nave and the spokes.

Outstandingly, it is an object of my invention to produce a wheel the body of which at large is composed of a very high section modulus in the diametral plane. In the attainment of this object I employ a nave portion axially very deep and annularly of relatively great diameter and give to it through a general conical form the outstandingly good characteristics of the well known single disc wheel.

A scarcely secondary aim of my invention is the attainment of individual spokes likewise of high section modulus and rigidity. This I attain by foreshortening the lengths of the spokes and increasing their cross sections, the foreshortening of the spokes being complemental to the elongation of the diameter of the nave portion of the wheel.

Allied with the attainment of individual spokes of great rigidity is an aim to give the spokes the greatest possible strength in the region of their joinder to the nave portion of high section modulus, and to avoid localization of fatigue stress in these regions of joinder, that is to say, at their roots. A gradual emergence of the spoke from the nave portion of high section modulus in the zone inwardly very substantially removed from the zone of maximum diameter, and a broad and wide filleting of the annular merging of side walls of the spokes with the nave contribute largely to this result.

My invention also comprehends simple, strong and economical securing means between the wheel body at the outer ends of the spokes and the rim.

Finally, it is my endeavor to give the wheel the strongest possible construction in the region of the bolting on circle for the wheel of my invention is a demountable wheel and in demountable wheels great strength is needed in this region.

In the accompanying drawing—

Figure 1 is a side elevation of the upper half of a wheel.

Figure 2 is a substantially axial cross section on line 2—2 of Fig. 1 looking in the direction of the arrows.

Figure 3 is a cross sectional detail at a bolt hole in the region of the bolted on circle on line 3—3 of Fig. 1.

Figure 4 is a transverse cross section of a single spoke on line 4—4 of Fig. 1.

The wheel illustrated is a demountable wheel, but it should be understood at the outset that the invention may be used in connection with a wheel of the demountable rim type. The rim 10 is a drop center type but it may be of other form. It is shown connected to the wheel body 11 by rivets 19 in a manner presently to be described. The wheel body 11 is provided in its central portion with an opening 18 adapting it to be slipped over the barrel of a hub or the end of an axle. Surrounding the opening 18 is a bolting on flange having a row of bolt holes 15 lying on the bolting on circle of the wheel. Through the bolt holes 15 are projected studs by means of which the wheel is demountably secured in place to the hub flange in accordance with the usual practice.

It is in connection with the main body 11 of the wheel that the principal features of my invention are to be found. The main body is comprised of a nave 23—24 of double conical form. The inner portion 24 has the apex of its cone directed axially inwardly of the wheel body while the outer cone 23 has its apex directed axially outwardly of the wheel body. It will thus be seen that the nave is of deeply channeled form in axial cross-section. The bolt holes 15 are located in the inner cone portion 24 which may be termed the hub securing zone of the wheel. At intervals the cone 24 is depressed axially inwardly as at 17 to form plane portions substantially at right angles to the axis of the wheel adapted to be bolted to a radially extending hub flange.

The outer cone 23 constituting the nave proper or spoke bearing portion is of relatively large diameter approaching nearly the over-all diameter of the wheel body 11 at large, that is to say, the inner diameter of the rim 10. It is likewise deeply dished or of relatively great axial depth as compared with the bodies of the spokes. As will be seen by reference to Fig. 2, the nave portion 23 extends radially outwardly and axially inwardly from the point 28 of joinder of the two cones, which point constitutes the axially outermost extremity of the wheel body. This form of the portion 23 together with the form of the portion 24 gives to the nave at large as composed of these two portions, a very high section modulus in the diametral plane, that is to say, a plane defined by the axis and a diameter.

Deep coned forms are common in single disc wheels and are known to possess high section moduli. Moreover, such forms yield to a greater or less extent depending upon the form of the cone and the gauge of the metal, to transverse impact loads directed axially inwardly of the wheel, that is to say, toward the base of the cone, but are less yielding and relatively rigid under transverse impact loads directed axially outwardly toward the apex of the cone.

Emanating integrally from the outer cone 23 of the nave are short stubby spoke bodies 25, as shown in Fig. 4. The lengths of the spoke bodies 25 are relatively very small as compared with the maximum radius of the conical nave 23—24, only a fraction thereof, and both the depth and width of cross section of the spokes as compared with their relatively short length is in turn relatively great, that is to say, a substantial fraction thereof. This gives to the spokes individually high section moduli and great resistance to shear loads. It enables them to carry the very highest loadings directly into the nave 23—24 where the stresses are most advantageously distributed.

The spokes 17 have the apices of their cross section outwardly disposed and are in general channel or U-shaped, presenting their channels axially inwardly. The apices 26 of the roots of the spokes emanate from a zone very considerably within the periphery 27 of the nave 23 and in the form shown very close to the zone 28 of joinder of the cone 23 with the cone 24. The apices 26 then sweep gradually axially inwardly and radially outwardly in a broad curve as clearly appears in Fig. 2. The lateral side walls of the spokes 25 in turn emanate from the cone 23 through curves 29 of considerable radius merging smoothly into the side walls themselves. Through these expedients stresses are distributed widely and gradually from the roots of the spokes into the conically shaped nave 23 and localization of stresses resulting in early fatigue of the metal is wholly obviated.

From the foregoing it will be seen that the main body may comprise a single stamping, as clearly shown in Figures 1 and 2, the stamping consisting of three zones, an inner bolting on zone, an intermediate zone comprising the nave portion from which the spokes emanate, and an outer zone including the spoke bodies extending beyond the nave portion.

The emanation of the roots of the spokes from a zone radially within the periphery 27 of the cone 23, of course, corrugates the surface of the cone, especially does it deeply corrugate the periphery 27 where the axially inwardly open cross sections are deepest. This might very well result in decreasing the otherwise high section modulus in the diametral plane when relatively light gauge metal is used, permitting more or less weaving. The provision of a supplemental conical nave member 12 in the form of a reinforcing annulus secured at its periphery by welding or otherwise to the peripheral portion 27 of the nave 23 and at its inner circumference to the portion 24, not only precludes such weaving but restores and carries to yet higher value the already high section modulus in the diametral plane of the nave of the wheel. Obviously, when the side walls of the spokes 25 are tied together by welds 30 to the continuous periphery of the reinforcing annulus, they cannot spread apart. Obviously also, the continuous periphery of the annulus 12 takes the place of the destroyed continuity of the periphery of the nave 23—24. Thereby the outstandingly good characteristics of the conical form of this nave are preserved without giving up the advantages gained through the emanation of the spokes from zones inwardly of the periphery.

Yet further, the annular reinforcing member 12 is secured to the inner portion 24 of the nave by welding 31 in the flattened portions thereof. This effects a substantial triangular structure between the three cones 23, 24, 12 intermediate each pair of spokes and this triangulated structure affords yet further increase of the section modulus. The result is that such a wheel may be made of relatively light gauge metal especially in the one piece stamping of the main body 11 comprehending the nave portions 23—24 and the spokes 25, thus keeping the weight of the wheel very small indeed as compared with other metal wheels, and yet provide every strength necessary for the wheel.

The annular reinforcing member 12 is especially helpful in strengthening each individual spoke. This becomes more fully apparent when by his own inspection of Figures 1 and 2 one sees that flanking each spoke and lying in between each spoke and the next one adjacent is a box structure triangular in axial cross section comprised of the three coned members 23, 24 and 12. Thus each spoke is supported by a pair of such triangulated cross sections on its opposite flanks. The radially inward and axially outward curvature of the root of the spoke lies between this pair of triangular cross sections. The strength of this support is augmented greatly of course by the annular continuity of the member 12 and the annularly continuous portion 28 of members 23 and 24.

The outer ends of the spokes may be open. Within them are spot welded end caps 13 axially of angular cross section and transversely complemental to the spoke ends. These caps receive the rivets 19.

The annular reinforcing member 12 in the regions of the depressed portions 17 of the nave portion 24 in the hub securing zone is formed complemental to these depressed portions and together they are coined axially inwardly about the bolt holes 15 which pass through them both to afford seats 32 for the spherically headed cap nuts by means of which the wheel is held in place upon the studs of the hub flange. The inner peripheries of both member 12 and nave portion 24 are flanged axially inwardly to form a common impinging bearing 33.

A most excellent idea of the final behavior of the wheel may be had by considering respectively bending moment about a diameter b—b as indicated in Fig. 1, in the diametral plane about an axis a—a passing through the triangulated sections 12, 23, 24 of Figure 2 but located by line a—a in Figure 1 a chordal axis of the nave, and c—c transversely of the spoke being a transverse axis of a spoke. It is against bending on a diameter b—b that the highly increased section modulus in a diametral plane becomes effective, for all the conical structures are axially intersected by an axial plane including b—b. It is against bending about an axis such as a—a that the individual spokes are so strongly increased in section modulus in the region of their roots by the flanking triangular sections 12, 23, 24. It is against bending about an axis c—c that the main bodies of the spokes being relatively short and stubby and having their side walls tied together respectively by the annulus 12 through the welds 30 and by the end caps 13 through the welds 20, develop as spoke bodies highly improved resistance to bending.

To face the wheel a hub cap 22 is appropriately abutted against the apex of the main body 23 of the nave, the cap being provided with an inturned flange 34 for this purpose. Likewise, the drop center of the rim 10 is provided with an ornamental beading 14. Both may be attached in any convenient manner.

The wheel of my invention has been subjected to a wide variety of practical tests running many hundreds of miles on vehicles on roadways and has withstood the most severe of laboratory tests on machines imposing regular and irregular loads simulating those in actual practice. In all of these it equals in performance the very best of wheels of all other types.

While I have shown and described but one form of my invention, obviously it is capable of others and it is my intention that the circumstantial terminology of the specification and claims should be given every breadth to which the spirit of the invention entitles it in view of the art which preceded my invention.

What I claim is:

1. A pressed metal artillery wheel body of the demountable bolted on type having a substantially radial bolting on flange, a spoke bearing portion extending radially outwardly thereof having a deeply dished generally conical form and a continuous substantially annular portion connecting said flange and spoke bearing portion, and means connecting the outer periphery of said spoke bearing portion and said flange constituting in the body of the wheel beyond said bolting on flange a substantially box cross section in an axial plane, and spokes having roots pressed from said conical portion and of increasing axial depth radially outwardly, said spokes having main bodies merging with the roots and extending therebeyond.

2. A pressed metal artillery wheel body of the demountable bolted on type having a substantially radial bolting on flange, a spoke bearing portion extending radially outwardly thereof having a deeply dished generally conical disc like form, spokes having root portions pressed from said conical portion and of axially increasing depth radially outwardly, said spokes having main bodies merging with the outer axially deepest portions of the roots and extending therebeyond, a substantially annular part connecting said flange and spoke bearing portion forming with the latter a substantially annular channel facing axially and means secured to portions of the wheel body in bridging relation to said channel.

3. A pressed metal artillery wheel body of the demountable bolted on type having a substantially radial bolting on flange, a spoke bearing portion extending radially outwardly thereof having a generally conical disc like form, its outer peripheral diameter approaching nearly that of the wheel body, spokes having roots pressed from said conical portion and of increasing axial depth radially outwardly, said spokes having unconnected short stubby main bodies, means connecting said flange and conical portion and forming with the latter a substantially annular channel facing axially, and additional means bridging the channel and tied to the outer periphery of said conical portion intermediate the spokes and to a portion of the wheel radially inwardly of the conical portion.

4. A vehicle wheel including in combination a unitarily stamped sheet metal body comprising a substantially radial bolting-on flange, a spoke spider embodying a plurality of radially-extending spokes of hollow cross section and a conical nave, the roots of said spokes emanating from a substantial portion of the width of said nave, and a substantially annular part connecting said flange and the radially inner end of said nave, said flange being disposed inwardly of the axially outermost end of the nave and a reinforcing plate connecting said flange and the radially outer end of said nave and forming with said nave and annular part a box cross section disposed radially outwardly of the bolting-on flange, said reinforcing plate extending substantially radially between its points of connection to the wheel body.

5. A vehicle wheel comprising in combination a unitarily stamped wheel body including a substantially radial bolting-on flange, a conical nave portion and hollow spokes having their roots emanating from a substantial portion of the width of said nave and a generally axially-extending portion connecting the radially inner end of said nave and said flange and forming with the nave a relatively deep axially-facing channel and a reinforcing plate connecting the radially outer ends of the nave and said flange and bridging said channel.

6. A vehicle wheel including in combination a unitarily stamped sheet metal body comprising a nave of double conical form, a plurality of radially-extending spokes extending radially from the outer periphery of the outer cone and having roots pressed therefrom, the inner cone being axially depressed at intervals to provide radially-extending portions constituting a substantially radially-etxending bolting-on flange.

7. A vehicle wheel including in combination a unitarily stamped sheet metal body comprising a nave of double conical form, a plurality of radially-extending spokes extending radially from the outer periphery of the outer cone and having roots pressed therefrom, the inner cone being axially depressed at intervals to provide radially-extending portions constituting a substantially radially-extending bolting-on flange, and a bridging reinforcing plate connecting said flange and outer cone and engaging the latter at the inner extremities of the spokes.

8. A vehicle wheel including in combination a unitarily stamped sheet metal body comprising a nave of double conical form and channel spokes projecting radially beyond the outer periphery of said nave and having their root portions emanating from a substantial portion of the width of said outer cone, the inner cone having radially-extending portions constituting a bolting-on flange.

9. A vehicle wheel including in combination a unitarily stamped sheet metal body comprising a nave of double conical form and channel spokes projecting radially beyond the outer periphery of said nave and having their root portions emanating from a substantial portion of the width of said outer cone, the inner cone having radially-extending portions constituting a bolting-on flange, said cones combining to form a relatively deep axially-facing channel, and a reinforcing plate bridging said channel.

10. A pressed metal wheel body of the demountable bolted-on type comprising a bolting-on flange, a main stamping supported thereby and formed immediately radially outwardly of the bolting-on flange with an annular rearwardly facing channel, and a reinforcing annulus connected between the channel walls and forming therewith a box section, the main stamping radially outwardly of the channel constituting the entire depth of the wheel body.

11. A pressed metal wheel body of the demountable bolted-on type comprising a main stamping having spokes, a conical nave from which the roots of the spokes are pressed, and an annular axial extension of said nave combining with the nave to form an annular axially-facing channel, a single bolting-on flange extending radially inwardly from said annular extension on the nave, and an annular reinforcing plate bridging the channel and having its outer edge secured to the main stamping at the outer periphery of the nave and having its inner edge secured to the axially innermost portion of said annular extension, said main stamping comprising the full depth of the wheel body in the zone of the spokes.

12. An artillery wheel body including a single sheet metal stamping adapted to transmit substantially all of the wheel load between a hub element and a rim element, said stamping comprising a nave including a mounting portion from which the wheel body extends freely to the rim element and a spoke-bearing portion supported solely by and arranged radially outwardly of said mounting portion, said spoke-bearing portion having a relatively large diameter as compared to the outer peripheral diameter of said mounting portion and having its radially outer areas deeply dished axially in one and the same general direction, said nave being so constructed and arranged as to provide a single dished load-supporting disc and short hollow-sectioned spoke formations having roots pressed from said areas with the hollow cross sections of their bodies in open communication with the interior of said areas thereby interrupting portions of said areas, said spoke formations being constructed and arranged to stiffen said areas to thereby measurably compensate for impairment of strength through said interruption, and an annulus connected to the inner surface of the radially outer areas of the spoke-bearing portion and thereby restoring the continuity of such areas.

13. An artillery wheel body including a single stamping adapted to transmit substantially all of the wheel load between a hub element and a rim element, said stamping comprising a nave including a mounting portion from which the wheel body extends freely to the rim element, a generally axially extending portion projecting freely from the periphery of said mounting portion, and a spoke-bearing portion extending from the end of said generally axially-extending portion removed from said mounting portion and at least partially overlying said generally axially-extending portion and terminating in an outer peripheral edge of relatively large diameter as compared to the outer peripheral diameter of said mounting portion and having its radially outer areas deeply dished axially in one and the same general direction from said peripheral edge, said nave being so constructed and arranged as to provide a single dished load-supporting disc in operation, short hollow-sectioned spoke formations having roots pressed from said areas with the hollow cross-sections of their bodies in open communication with the interior of said areas thereby interrupting portions of said areas, said spoke formations being constructed and arranged to stiffen said areas to thereby measurably compensate for impairment of strength through said interruption, and an annular reinforcing plate operatively connecting the axially inner end of the axially extending portion and the radially outer end of the spoke-bearing portion and combining with said portions to form an annular box section.

14. In a combined disc and artillery wheel, a wheel body including a bolting-on flange adapted for attachment to a hub element and extending freely from said bolting-on flange to a rim element, said wheel body comprising a single stamping adapted to take substantially the entire load between the rim element and the hub element, said stamping including a bolting-on flange portion and having three annular zones, the inner zone comprising a dished disc portion of substantial radial extent, the outer zone comprising short hollow section spokes of high section modulus and the intermediate zone constituting a merger between the inner disc and the outer spoke zones in which the spokes have roots pressed from a prolongation of the inner disc zone and through which the spokes open radially inwardly, said intermediate zone having an axial extent greater than the axial depth of the spokes and being reinforced by said spokes, the radially outer extremity of the intermediate zone being at least midway from the outer periphery of the bolting-on flange portion to the outer periphery of the stamping, and an annular reinforcing plate tying together the portions of the intermediate zone between the spokes.

15. A combined disc and artillery wheel body comprising a single stamping adapted to take substantially the entire load between a rim and a hub, said stamping comprising a bolting-on flange and outwardly of said flange including three annular zones, the inner zone comprising a dished disc portion of substantial radial and axial extent, the outer zone comprising short spokes of high section modulus and the intermediate zone constituting a merger of substantial axial extent between the inner and outer zones reinforced by said spokes and located by the diameter of the inner zone in a region of minor wheel stresses, said intermediate and inner zones combining to produce an axially facing channel having a radial depth at its mouth at least as great as the radial extent of the outer zone, and an annular reinforcing plate bridging the mouth of the channel and tying the walls thereof together.

16. An artillery wheel body including a single stamping adapted to transmit substantially all of the wheel load between a hub element and a rim element, said stamping comprising a nave including a mounting portion from which the wheel body extends freely to the rim element, a generally axially extending portion projecting freely from the periphery of said mounting portion, and a spoke-bearing portion extending from the end of said generally axially-extending portion removed from said mounting portion and at least partially overlying said generally axially-extending portion and terminating in an outer peripheral edge of relatively large diameter as compared to the outer peripheral diameter of said mounting portion and having its radial outer areas deeply dished axially in one and the same general direction from said peripheral edge, said nave being so constructed and arranged as to provide a single-dished-load-supporting disc in operation, and short hollow-sectioned spoke formations having roots pressed from said areas with the hollow cross-sections of their bodies in open communication with the interior of said areas thereby interrupting portions of said areas, said spoke formations being constructed and arranged to stiffen said areas to thereby measurably compensate for impairment of strength through said interruption, and an annulus connected to the inner surface of the radially outer areas of the spoke-bearing portion and thereby restoring the continuity of such areas.

17. A combined disc and artillery wheel body comprising a single stamping adapted to take substantially the entire load between a rim and a hub, said stamping comprising a bolting-on flange and outwardly of said flange including three annular zones, the inner zone comprising a dished disc portion of substantial radial and axial extent, the outer zone comprising short spokes of high section modulus and the intermediate zone constituting a merger of substantial axial extent between the inner and outer zones reinforced by said spokes and located by the diameter of the inner zone in a region of minor wheel stresses, said intermediate and inner zones combining to produce an axially facing channel having a radial depth at its mouth at least as great as the radial extent of the outer zone, and an annular reinforcing member tying together the outer portions of the intermediate zone between the spokes.

CAROLUS L. EKSERGIAN.